US011969908B2

(12) United States Patent
Shen et al.

(10) Patent No.: US 11,969,908 B2
(45) Date of Patent: Apr. 30, 2024

(54) RAZOR BLADE

(71) Applicant: The Gillette Company LLC, Boston, MA (US)

(72) Inventors: Bin Shen, Shanghai (CN); Yongqing Ju, Boston, MA (US); Kenneth James Skrobis, Maynard, MA (US); William Owen Jolley, Spencer, MA (US); Thorsten Knobloch, Brookline, MA (US)

(73) Assignee: The Gillette Company LLC, Boston, MA (US)

( * ) Notice: Subject to any disclaimer, the term of this patent is extended or adjusted under 35 U.S.C. 154(b) by 4 days.

(21) Appl. No.: 17/231,579

(22) Filed: Apr. 15, 2021

(65) Prior Publication Data

US 2021/0323181 A1 Oct. 21, 2021

Related U.S. Application Data

(60) Provisional application No. 63/010,925, filed on Apr. 16, 2020.

(51) Int. Cl.
*B26B 21/56* (2006.01)
*B26B 21/16* (2006.01)

(52) U.S. Cl.
CPC .......... *B26B 21/565* (2013.01); *B26B 21/165* (2013.01)

(58) Field of Classification Search
CPC ..... B26B 21/60; B26B 21/165; B26B 21/565; B26B 21/56
USPC .............................................................. 30/50
See application file for complete search history.

(56) References Cited

U.S. PATENT DOCUMENTS

| | | | |
|---|---|---|---|
| 1,135,008 | A | 4/1915 | Fuller |
| 2,065,654 | A | 12/1936 | Claisse |
| 2,244,053 | A | 6/1941 | Comstock |
| 2,697,951 | A | 12/1954 | Muller |
| 2,703,451 | A | 3/1955 | Struve et al. |

(Continued)

FOREIGN PATENT DOCUMENTS

| | | | | |
|---|---|---|---|---|
| BE | 804415 A * | 3/1974 | ............ B26B 21/22 |
| CH | 444710 A | 9/1967 | |

(Continued)

OTHER PUBLICATIONS

15681 PCT Search Report and Written Opinion for PCT/US2021/027445 dated Sep. 14, 2021, 14 pages.

(Continued)

*Primary Examiner* — Nhat Chieu Q Do
(74) *Attorney, Agent, or Firm* — Kevin C. Johnson

(57) ABSTRACT

A razor blade is provided comprising a substrate comprising a first portion and a second portion. The first portion may comprise first and second generally parallel outer surfaces. The second portion may comprise first and second sections separated by a split line. The first section may comprise a first facet extending directly from the first outer surface of the first portion and an end facet extending directly from the first facet. The second section may comprise an end facet. The end facets of the first and second sections may converge at a tip to define a cutting edge. The split line may pass through the tip and is generally parallel with and extends between the first and second outer surfaces of the first portion.

8 Claims, 6 Drawing Sheets

(56) References Cited

U.S. PATENT DOCUMENTS

| | | | | |
|---|---|---|---|---|
| 3,514,856 | A | 6/1970 | Camp et al. | |
| 3,606,682 | A | 9/1971 | Camp et al. | |
| 3,761,374 | A | 9/1973 | Bromer et al. | |
| 3,842,499 | A * | 10/1974 | Dorion, Jr | B26B 21/54 30/50 |
| 3,861,040 | A | 1/1975 | Dorion, Jr. | |
| 3,863,340 | A * | 2/1975 | Perry | B26B 21/22 30/50 |
| 5,232,568 | A | 8/1993 | Parent et al. | |
| 5,295,305 | A | 3/1994 | Hahn et al. | |
| 5,630,275 | A | 5/1997 | Wexler | |
| 6,212,777 | B1 | 4/2001 | Gilder et al. | |
| 6,327,784 | B1 | 12/2001 | Altena et al. | |
| 6,599,178 | B1 | 7/2003 | Gluche et al. | |
| 7,060,367 | B2 | 6/2006 | Yamada et al. | |
| 9,969,094 | B2 | 5/2018 | Hejmowski et al. | |
| 10,549,438 | B2 | 2/2020 | Skrobis et al. | |
| 11,148,309 | B2 | 10/2021 | Sonnenberg et al. | |
| 2004/0226176 | A1 | 11/2004 | Peterlin | |
| 2005/0028389 | A1 | 2/2005 | Wort et al. | |
| 2007/0283578 | A1 | 12/2007 | Newman | |
| 2008/0086888 | A1 | 4/2008 | Scheinfeld | |
| 2010/0011590 | A1 | 1/2010 | Depuydt et al. | |
| 2012/0317822 | A1 | 12/2012 | Ochiai et al. | |
| 2013/0014395 | A1 | 1/2013 | Patel et al. | |
| 2013/0031794 | A1 | 2/2013 | Duff, Jr. et al. | |
| 2014/0360021 | A1 | 12/2014 | Sonnenberg et al. | |
| 2015/0328789 | A1 | 11/2015 | Skrobis et al. | |
| 2016/0096282 | A1 | 4/2016 | Doyle et al. | |
| 2017/0136640 | A1 | 5/2017 | Skrobis et al. | |
| 2017/0136641 | A1 | 5/2017 | Siozios et al. | |
| 2017/0341250 | A1 | 11/2017 | Skrobis et al. | |
| 2018/0043561 | A1 | 2/2018 | Nisby et al. | |
| 2018/0162000 | A1 | 6/2018 | Duff, Jr. et al. | |
| 2018/0264669 | A1 | 9/2018 | Howell | |
| 2021/0094199 | A1* | 4/2021 | Lee | B26B 21/60 |
| 2021/0276211 | A1 | 9/2021 | Harris | |
| 2021/0323180 | A1 | 10/2021 | Shen et al. | |
| 2021/0323182 | A1 | 10/2021 | Skrobis et al. | |
| 2021/0323183 | A1 | 10/2021 | Skrobis et al. | |
| 2021/0323184 | A1 | 10/2021 | Skrobis et al. | |
| 2023/0032402 | A1 | 2/2023 | Gluche et al. | |
| 2023/0037149 | A1 | 2/2023 | Gluche et al. | |
| 2023/0051077 | A1 | 2/2023 | Gluche et al. | |
| 2023/0066180 | A1 | 3/2023 | Gluche et al. | |

FOREIGN PATENT DOCUMENTS

| | | | | |
|---|---|---|---|---|
| EP | 0628379 | A1 | 12/1994 | |
| EP | 1397234 | A1 | 3/2004 | |
| EP | 1985726 | A1 | 10/2008 | |
| EP | 3683332 | A1 | 7/2020 | |
| EP | 3828311 | A1 | 6/2021 | |
| JP | S6148391 | A | 3/1986 | |
| JP | H08323507 | A | 12/1996 | |
| WO | 0246526 | A1 | 6/2002 | |
| WO | 02083374 | A2 | 10/2002 | |
| WO | WO-02100610 | A1 * | 12/2002 | B26B 21/58 |
| WO | 03101683 | A1 | 12/2003 | |
| WO | 2004091871 | A1 | 10/2004 | |
| WO | 2006045460 | A1 | 5/2006 | |
| WO | 2008065949 | A1 | 6/2008 | |
| WO | 2010138371 | A1 | 12/2010 | |
| WO | 2016057473 | A1 | 4/2016 | |
| WO | 2016079148 | A1 | 5/2016 | |
| WO | 2016153798 | A1 | 9/2016 | |

OTHER PUBLICATIONS

All Office Actions, U.S. Appl. No. 17/231,561.
All Office Actions, U.S. Appl. No. 17/231,605.
All Office Actions, U.S. Appl. No. 17/231,627.
All Office Actions, U.S. Appl. No. 17/231,593.
Unpublished U.S. Appl. No. 17/231,593, filed Apr. 15, 2021, to Kenneth James Skrobis et al.
Unpublished U.S. Appl. No. 17/231,561, filed Apr. 15, 2021, to Kenneth James Skrobis et al.
Unpublished U.S. Appl. No. 17/231,605, filed Apr. 15, 2021, to Bin Shen et. al.
Unpublished U.S. Appl. No. 17/231,627, filed Apr. 15, 2021, to Kenneth James Skrobi et. al.

* cited by examiner

RAZOR BLADE

FIELD OF THE INVENTION

The invention generally relates to razor blades and cartridges and more particularly to asymmetric blades, cartridges and assemblies.

BACKGROUND OF THE INVENTION

Razor cartridges typically comprise a cartridge housing including cap and guard structures and one or more razor blade assemblies located between the cap and guard structures. A plane may extend between the upper surfaces of the cap and guard structures to define a shaving plane. The razor blade assemblies typically comprise razor blades having a symmetrical shape. It is well known that the shaving geometry of a razor cartridge is important in determining the shaving performance of the cartridge. The shaving geometry defines the position and orientation of the blades in relation to other skin contacting parts, in particular, the cap structure and guard structure of the razor cartridge. One parameter of the shaving geometry is blade exposure, which is the perpendicular distance by which the cutting edge of a blade protrudes above or below the shaving plane. While current razor blades perform adequately, in order for next generation products to perform better, improvements in shaving geometry such as blade shape can be made.

SUMMARY OF THE INVENTION

In accordance with a first aspect of the present disclosure, a razor blade is provided comprising a substrate comprising a first portion and a second portion. The first portion may comprise first and second generally parallel outer surfaces. The second portion may comprise generally asymmetric first and second sections separated by a split line. The first section may comprise first and third facets and the second section may comprise a second facet. The first facet may extend inwardly from the first parallel outer surface. The second facet may extend inwardly from the second parallel outer surface. The second and third facets may converge at a tip to define a cutting edge. The split line may pass through the tip and may be generally parallel with the first and second outer surfaces of the first portion. The second facet may be located closer to the split line than the first and third facets. The second facet may have a length greater than the length of the third facet and the first facet may extend directly from the first outer surface of the first portion and the third facet may extend directly from the first facet.

A plane extending through a center of the first portion may extend through one of the first or the third facet.

A bevel shoulder may be positioned between the first facet and the third facet defining a skin-contacting surface.

A first angle between the first facet and the first outer surface of the first portion may be greater than a second angle between the second facet and the second outer surface of the first portion.

A third angle between the third facet and the first facet may be greater than a second angle between the second facet and the second outer surface of the first portion.

At a distance of 4 micrometers from the tip, a sum of a first distance from the third facet to the split line and a second distance from the second facet to the split line may be between 1.0 microns to 2.3 microns. At a distance of 8 micrometers from said tip, a sum of a first distance from the first or the third facet to the split line and a second distance from the second facet or the second parallel outer surface of the first portion to the split line may be between 1.9 microns to 4.6 microns. At a distance of 16 micrometers from said tip, a sum of a first distance from the first or the third facet to the split line and a second distance from the second facet or the second parallel outer surface of the first portion to the split line may be between 3.8 to 9.2 microns.

A first angle extending between the first facet and the first outer surface of the first portion has a first value, a second angle extending between the second facet and the second outer surface of the first portion has a second value, a third angle extending between the third facet and the first facet has a third value, and a wedge angle extending between the second facet and the third facet has a fourth value substantially equal to the sum of the first value, the second value and the third value.

In accordance with a second aspect of the present disclosure, a razor blade is provided comprising a substrate comprising a first portion and a second portion. The first portion may comprise first and second generally parallel outer surfaces. The second portion may comprise first and second sections separated by a split line. The first section may comprise a first facet extending directly from the first outer surface of the first portion and an end facet extending directly from the first facet. The second section may comprise an end facet. The end facet of the second section may have a length greater than the end facet of the first section. The end facets of the first and second sections may converge at a tip to define a cutting edge. The split line may pass through the tip and is generally parallel with and extends between the first and second outer surfaces of the first portion.

The end facet of the second section may comprise a second facet and the end facet of the first section may comprise a third facet.

The second section may further comprise a second facet extending from the second outer surface of the first portion and the end facet of the second section may comprise a fourth facet and the end facet of the first section may comprise a third facet.

The end facet of the second section may be located closer to the split line than the first facet and the end facet of the first section.

In accordance with a third aspect of the present disclosure, a razor blade is provided comprising a substrate comprising a first portion and a second portion. The first portion may comprise first and second generally parallel outer surfaces. The second portion may comprise generally asymmetric first and second sections separated by a split line. The first section may comprise first and third facets and the second section may comprise second and fourth facets. The first and second facets may be positioned between the first and second generally parallel outer surfaces and the third and fourth facets. The third and fourth facets may converge at a tip to define a cutting edge. A length of each of the first and second facets may be greater than a length of each of the third and fourth facets.

The fourth facet may have a length greater than a length of the third facet.

A first angle between the first facet and the first outer surface of the first portion may be greater than a second angle between the second facet and the second outer surface of the first portion.

A third angle between the third facet and the first facet may be greater than a fourth angle between the fourth facet and the second facet.

At a distance of 4 micrometers from the tip, a sum of a first distance from the third facet to the split line and a second distance from the fourth facet to the split line may be between 1.0 microns to 2.3 microns. At a distance of 8 micrometers from said tip, a sum of a first distance from the first or the third facet to the split line and a second distance from the second or the fourth facet to the split line may be between 1.9 microns to 4.6 microns. At a distance of 16 micrometers from said tip, a sum of a first distance from the first or the third facet to the split line and a second distance from the second or the fourth facet to the split line may be between 3.8 to 9.2 microns.

An angle between the second facet and the second outer surface of the first portion may fall within a range of from 0.5 degree and 6 degrees.

The split line may pass through the tip and may be generally parallel with the first and second outer surfaces of the first portion. The second and fourth facets may be located closer to the split line than the first and third facets.

The first facet may extend directly from the first outer surface of the first portion and the third facet may extend directly from the first facet.

A first angle extending between the first facet and the first outer surface of the first portion has a first value, a second angle extending between the second facet and the second outer surface of the first portion has a second value, a third angle extending between the third facet and the first facet has a third value, a fourth angle extending between the fourth facet and the second facet has a fourth value and a wedge angle extending between the third facet and the fourth facet has a fifth value substantially equal to the sum of the first value, the second value, the third value and the fourth value.

In accordance with a fourth aspect of the present disclosure, a razor blade is provided comprising a substrate comprising a first portion and a second portion. The first portion may comprise substantially parallel first and second outer surfaces. The second portion may comprise first, second, third and fourth facets. The first facet may extend from the first outer surface of the first portion inwardly at a first angle and the second facet may extend from the second outer surface of the first portion inwardly at a second angle. The third and fourth facets may extend from the first and second facets, respectively, inwardly to define a cutting edge and a length of the third facet may be different than a length of the fourth facet.

A summation of the first and second angles may fall within a range of from 8.5 degrees to 24 degrees.

A difference between the first and second angles may fall within a range of from 4 degrees to 17.5 degrees.

The first angle may fall within a range of from 8 degrees to 18 degrees.

The second angle may be different from the first angle.

The third facet may extend from the first facet inwardly at a third angle and the fourth facet may extend from the second facet inwardly at a fourth angle, which is different from the third angle.

A summation of the first and third angles may fall within a range of from 12 degrees to 28.5 degrees.

A summation of the second and fourth angles may fall within a range of from 1.5 degrees to 18 degrees.

A summation of the first, second, third and fourth angles may fall within a range of from 13.5 degrees to 30 degrees.

In accordance with a fifth aspect of the present disclosure, a razor blade is provided comprising a substrate comprising a first portion and a second portion. The first portion may comprise first and second generally parallel outer surfaces. The second portion may comprise generally asymmetric first and second sections separated by a split line. The first section may comprise first and third facets and the second section may comprise second and fourth facets. The first and second facets may be positioned between the first and second generally parallel outer surfaces and the third and fourth facets. The split line may pass through the tip and may be generally parallel with and may extend between the first and second outer surfaces of the first portion. The second and fourth facets may be located closer to the split line than the first and third facets.

The first facet may extend directly from the first outer surface of the first portion, the second facet may extend directly from the second outer surface of the first portion, the third facet may extend directly from the first facet and the fourth facet may extend directly from the second facet.

The fourth facet may have a length greater than a length of the third facet.

A first angle between the first facet and the first outer surface of the first portion may be greater than a second angle between the second facet and the second outer surface of the first portion.

A third angle between the third facet and the first facet may be greater than a fourth angle between the fourth facet and the second facet.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Introduction

Figure 1:
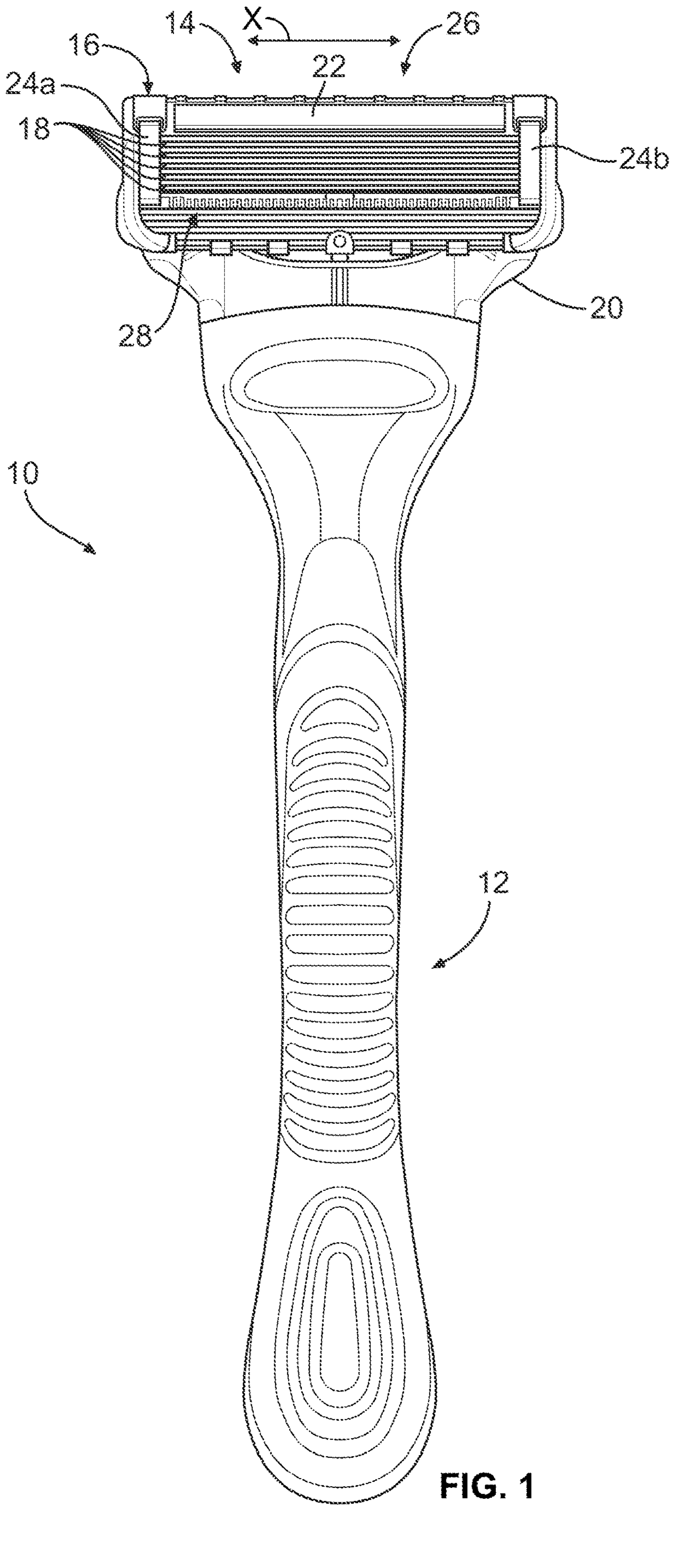
FIG. 1 is a front view of a razor system comprising a handle and a razor cartridge in accordance with the present disclosure.

The term "asymmetric blade," as used herein, means a blade defined by a substrate having a first portion comprising a blade body and a second portion comprising a tip portion wherein a split line passes through a tip of the tip portion, extends through the first and second portions and separates the second portion into generally asymmetric first and second sections. The outer surface of the first section of the second portion is asymmetric with regards to the outer surface of the second section. The outer surface of the first section of the second portion may function as a skin-contacting surface, and the outer surface of the second section of the second portion may function as a hair-cutting surface.

A "bevel shoulder," "bevel shoulder structure," or "shoulder" which can be used interchangeably, are used herein to signify the structure on the outer surface of the first section of the second portion of the substrate of the razor blade. The bevel shoulder structure is disposed where facets meet in the first section, and the bevel shoulder defines a significant portion of the skin-contacting surface of the blade. The bevel shoulder can be smooth, rounded, or angled and is generally a linear structure running parallel to a cutting edge. The bevel shoulder structure of the present invention performs the bulk of the skin-contacting function of the blade and, hence, takes pressure off the tip. In providing minimal to no tip pressure, the shoulder provides a highly defined skin-guarding benefit built into the first section. In asymmetric blades with bevel shoulders on the outer surface of the first section of the second portion of the substrate of the blade of the present invention, cutting forces can remain much lower than if the blade substrate were symmetric. This is due to the fact that there is desirably substantially no bevel shoulder, or minimal shoulder, on the hair cutting side (e.g., second section of the second portion). Having a prominent bevel shoulder on the second section, the section which dominates hair cutting efficacy, would disadvantageously increase the hair cutting forces. The bevel shoulder of the present invention will be described in more detail below.

A "split line," as used herein, means a line extending through the tip of the tip portion of the blade substrate, separates the second portion into asymmetrical first and second sections and is generally parallel with first and second generally parallel outer surfaces of the first portion defining the blade body of the blade substrate.

A "shaving plane," as used herein, means a plane extending between upper surfaces of a cap structure of a razor cartridge housing and a guard structure of the razor cartridge housing. The "shaving plane" can be a plane tangent to each of the cap structure and guard structure. In some embodiments, not all of the cap structure, guard structure and uppermost surface portions of the razor blades in a razor cartridge will be located within a same plane. For such embodiments, "shaving plane," as used herein, is intended to mean a plane extending between the uppermost surface portions of two skin contacting elements, one immediately in front of and one immediately behind the razor blade tip of the razor blade. For a first blade in a sequence of blades, the shaving plane is defined by a plane extending from an upper surface, i.e., uppermost surface portion, of the guard structure on a first side of the first razor blade tip and an uppermost surface portion of a skin contacting element directly adjacent to and on a second side of the first blade tip. For an intermediate blade in a sequence of blades, the shaving plane is defined by a plane extending from the uppermost surface portions of adjacent skin contacting elements on either side of the intermediate razor blade tip. In the present invention where the uppermost surface portion on a razor blade may be defined by the bevel shoulder, the uppermost surface portion of the skin contacting element immediately behind the razor blade tip of the razor blade may comprise the razor blade's bevel shoulder. An uppermost surface portion on a skin contacting element on either side of a razor blade tip can be an uppermost surface on an adjacent razor blade, an element on the razor blade itself (such as a bevel shoulder), or a guard structure. For razor blade 18A in FIG. 2B, the shaving plane is defined by a plane extending from the uppermost surface portion of razor blade 18B, the blade directly in front of the blade 18A, and the bevel shoulder (41, 81) of the razor blade 18A. The uppermost surface portion of razor blade 18B as shown is a bevel shoulder as well (e.g., 41, 81). For a first blade in a sequence of blades, such as razor blade 18E in FIG. 2B, the shaving plane is defined by a plane extending from the uppermost surface portion of a preceding guard structure 28 and the uppermost surface portion immediately behind the razor blade tip of the razor blade which in this instance may be the blade bevel shoulder (e.g., 41, 81) of razor blade 18E.

With reference to FIG. 1, a shaving razor system 10 comprises a handle 12 and a razor cartridge 14. In some examples, the razor cartridge 14 may be detachably mounted to the handle 12 with a connector 20 as shown, and in other examples, the razor cartridge 14 may be attached permanently to the handle 12. The razor cartridge 14 may pivot relative to the handle 12. The razor cartridge 14 may include a cartridge housing 16 having one or more blades 18. Although five blades are shown in FIG. 1, it is understood that any number of blades, more or less, may be mounted within the razor cartridge 14. The blades 18 may be mounted within the cartridge housing 16 and secured with clips 24*a* and 24*b* as shown. The cartridge housing 16 may further comprise a cap structure 22 located near a back of the cartridge housing 16 and one or more guard structures 28 located near a front of the cartridge housing 16. The cap structure 22 may comprise one or more lubrication members (not labeled).

Figure 3A:
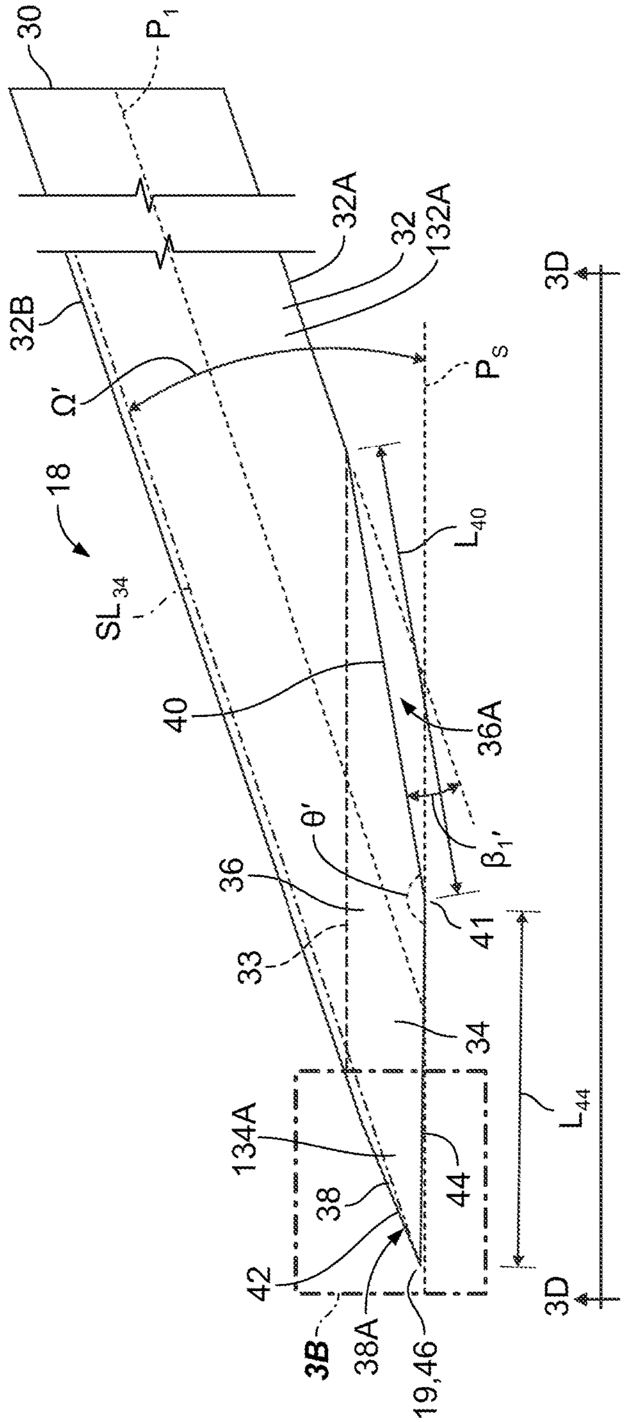
FIG. 3A is a cross-sectional side view of an asymmetrical razor blade in accordance with a first embodiment of the present disclosure.

FIG. 3A is a cross-sectional side view of an asymmetrical razor blade 18 in accordance with a first embodiment of the present disclosure. The razor blade 18 is defined by a substrate 30 comprising a first portion 32 comprising a blade body 132A and a second portion 34 comprising a tip portion 134A. In the embodiment of FIG. 3A, dotted line 33 extends between the first and second portions 32 and 34. The razor blade 18 may be formed from stainless steel, other metals and/or alloys, plastic, or any other material or combinations thereof. The first portion 32 may comprise first and second generally parallel outer surfaces 32A and 32B and may be defined by the portion of the substrate 30 where there are no facets. The second portion 34 may comprise generally asymmetric first and second sections 36 and 38, respectively, separated by a split line $SL_{34}$, wherein the first and second sections 36 and 38 comprise third and fourth asymmetric outer surfaces 36A and 38A. The split line $SL_{34}$ may pass through or emanate from a tip 46 of the tip portion 134A and may be generally parallel with the first and second outer surfaces 32A and 32B of the first portion 32 of the blade substrate 30, see FIG. 3A. The split line $SL_{34}$ may extend through the first portion 32. In the example embodiment of FIGS. 3A and 3B, the split line $SL_{34}$ does not separate the first and second portions 32 and 34 into equal halves. In the illustrated embodiment, the asymmetrical first and second sections 36 and 38 of the second portion 34 may extend longitudinally away from the tip 46 different distances.

The substrate 30 may be coated. Coatings on the substrate 30 may be in the range of 200 to 1500 angstroms, preferably between 300 and 1000 angstroms.

The first section 36 comprises first and third bevels or facets 40 and 44 and the second section 38 comprises a second bevel or facet 42. The first facet 40 may extend directly from the first outer surface 32A and may be positioned between the first outer surface 32A and the third facet 44. The third facet 44 may extend directly from the first facet 40. A bevel shoulder 41 may be defined where the first and third facets 40 and 44 meet. The bevel shoulder 41 is a structure that is generally linear (e.g., extending into the page and along the X direction) running parallel to a cutting edge 19 of the blade 18 as shown for instance in FIG. 3D. The bevel shoulder 41 may be smooth, rounded, or angled. The second facet 42 may extend directly from the second outer surface 32B. The second and third facets 42 and 44 may define end facets that converge at the tip 46 to define the cutting edge 19 of the blade 18, which performs the cutting of hair. As will be discussed further below, during use of the razor blade 18, the bevel shoulder 41 between the first and third facets 40 and 44 may contact and move along the skin of a user. An angle Θ' of the bevel shoulder 41, see FIG. 3A, extending from the first facet 40 to the third facet 44 may be from 162 degrees to 176 degrees.

Figure 3B:
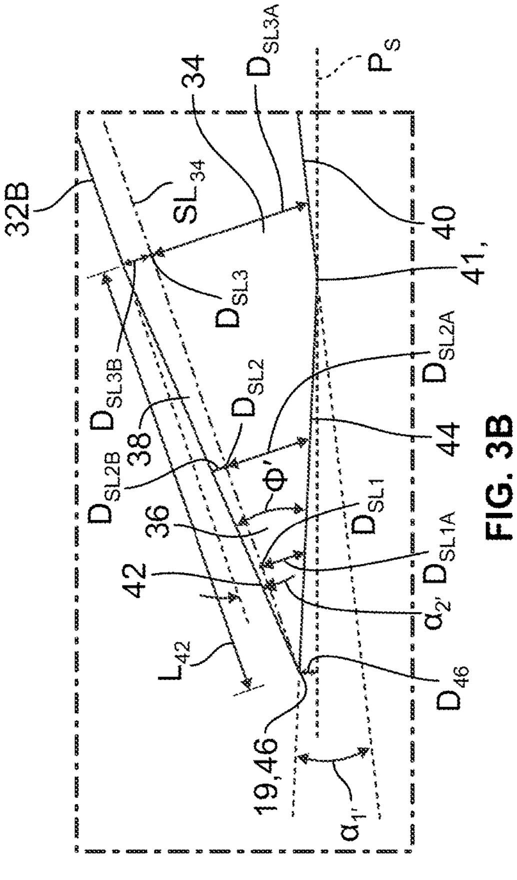
FIG. 3B illustrates an enlarged view of a tip portion of the razor blade of FIG. 3A.

A length $L_{40}$ of the first facet 40 may be greater than a length $L_{42}$ and $L_{44}$ of each of the second and third facets 42 and 44, see FIGS. 3A and 3B. The length $L_{44}$ of the third facet 44 may be less than the length of the second facet 42. In the illustrated embodiment, the length $L_{40}$ of the first facet 40 may be from 100 microns to 500 microns, the length $L_{42}$ of the second facet 42 may be from 8 microns to 200 microns and the length $L_{44}$ of the third facet 44 may be from 8 microns to 150 microns, preferably from 8 microns to 50 microns. The first facet 40 may extend inwardly from the first outer surface 32A toward the second outer surface 32B and the second facet 42 may extend inwardly from the second outer surface 32B toward the first outer surface 32A, see FIG. 3A. A plane $P_1$ extending through a center of the first portion 32 parallel to the first and second outer surfaces 32A and 32B may extend through the first facet 40, see FIG. 3A. As can be seen from FIG. 3A, the plane $P_1$ bisects the first portion 32 into equal halves.

A first angle $\beta_{1'}$ between the first facet 40 and a first line extending from the first outer surface 32A of the first portion 32 may be greater than a second angle $\alpha_{2'}$ between the second facet 42 and a second line extending from the second outer surface 32B of the first portion 32, see FIGS. 3A and 3B. A third angle $\alpha_{1'}$ between the third facet 44 and a third line extending from the first facet 40 may be greater than the second angle $\alpha_{2'}$ between the second facet 42 and the second line extending from the second outer surface 32B of the first portion 32. A wedge angle φ' may extend between the second and third facets 42 and 44, see FIG. 3B. A value of the wedge angle φ' may be equal to the sum of a value of the first angle $\beta_{1'}$, a value of the second angle $\alpha_{2'}$ and a value of the third angle $\alpha_{1'}$ and may fall within a range of from 13.5 degrees to 30 degrees. A smaller wedge angle φ' is advantageous as it may result in a sharper cutting edge of the blade 18. The first angle $\beta_{1'}$ may fall within a range of from 8 degrees to 21 degrees; the second angle $\alpha_{2'}$ may fall within a range from 1 degree to 12 degrees, preferably from 2 degrees to 8 degrees; and the third angle $\alpha_{1'}$ may fall within a range from 4 degrees to 18 degrees, preferably from 8 to 18 degrees. The sum of the first angle $\beta_{1'}$ and the third angle $\alpha_{1'}$ is greater than or equal to a blade tangent angle Ω, discussed below.

As noted above, the split line $SL_{34}$ separating the generally asymmetric first and second sections 36 and 38 of the second portion 34 of the razor blade 18 passes through the tip 46 and is generally parallel with the first and second outer surfaces 32A and 32B of the first portion 32, see FIG. 3A. A substantial portion of the second facet 42 may be located closer to the split line $SL_{34}$ than a substantial portion of each of the first and third facets 40 and 44, see FIGS. 3A and 3B.

With reference to FIG. 3B, at a first distance $D_{SL1}$ of 4 micrometers from the tip 46 along the split line $SL_{34}$, a sum of a first distance $D_{SL1A}$ perpendicular to the split line $SL_{34}$ and extending from the split line $SL_{34}$ to the third facet 44 and a second distance (reference not provided in FIG. 3B) perpendicular to the split line $SL_{34}$ and extending from the split line $SL_{34}$ to the second facet 42 may be between 1.0 micron to 2.3 microns. At a second distance $D_{SL2}$ of 8 micrometers along the split line $SL_{34}$ from the tip 46, a sum of a first distance $D_{SL2A}$ perpendicular to the split line $SL_{34}$ and extending from the split line $SL_{34}$ to the first or the third facet 40, 44 and a second distance $D_{SL2B}$ perpendicular to the split line $SL_{34}$ and extending from the split line $SL_{34}$ to the second facet 42 or the second outer surface 32B of the first portion 32 may be between 1.9 microns to 4.6 microns. At a third distance $D_{SL3}$ of 16 micrometers along the split line $SL_{34}$ from said tip 46, a sum of a first distance $D_{SL3A}$ perpendicular to the split line $SL_{34}$ and extending from the split line $SL_{34}$ to the first or the third facet 40, 44 and a second distance $D_{SL3B}$ perpendicular to the split line $SL_{34}$ and extending from the split line $SL_{34}$ to the second facet 42 or the second outer surface 32B of the first portion 32 may be between 3.8 microns to 9.2 microns.

Figure 2A:
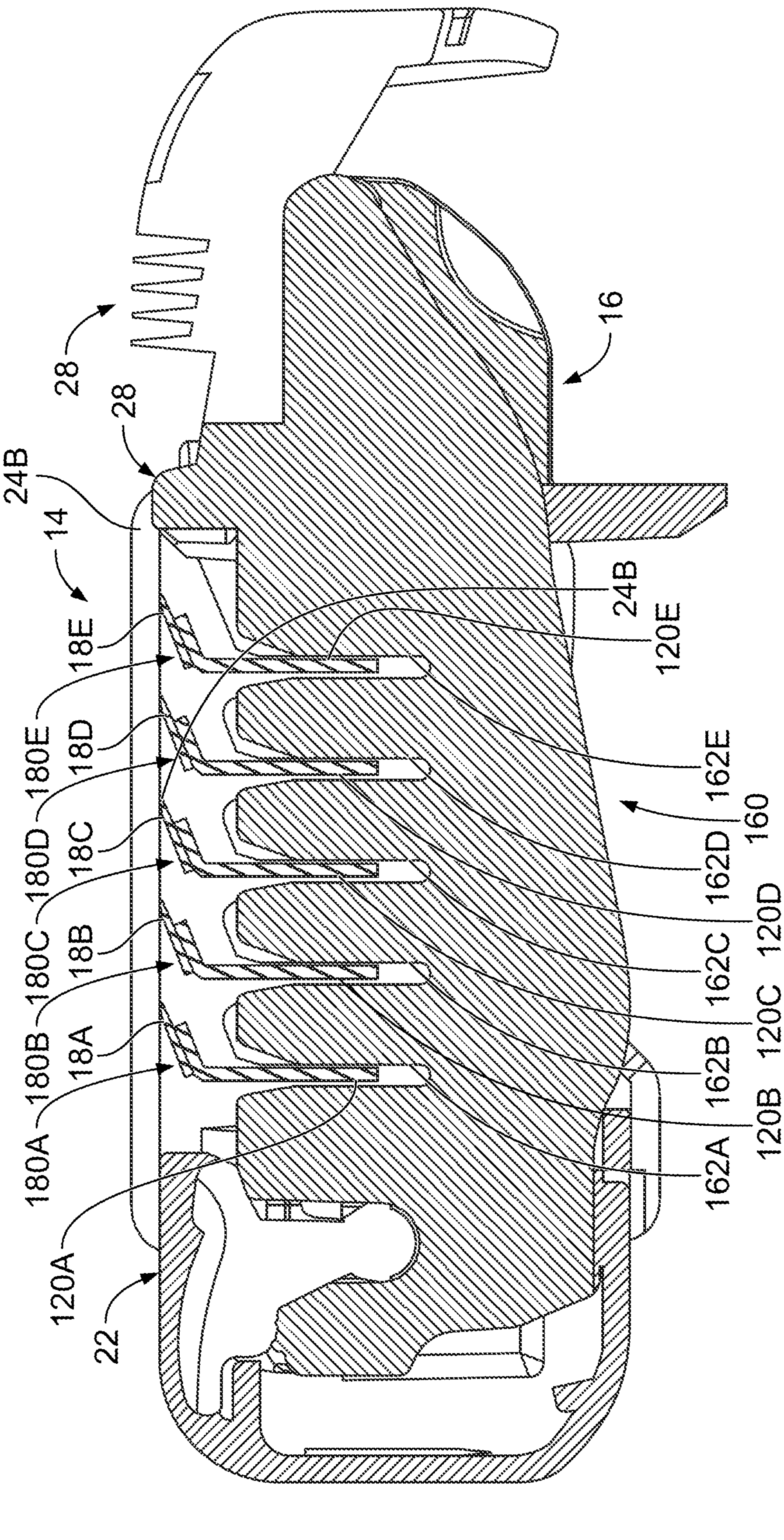
FIG. 2A is a cross-sectional view of the razor cartridge of FIG. 1.

FIG. 2A illustrates a cross-sectional view of the razor cartridge 14. The razor cartridge 14 further comprises first, second, third, fourth and fifth razor blade assemblies 180A-180E comprising first, second, third, fourth and fifth razor blades 18A-18E, wherein each of the razor blades 18A-18E is formed to correspond to the razor blade 18 illustrated in FIGS. 3A and 3B. The first blade assembly 180A may comprise the first blade 18A and a first blade support member or blade carrier 120A coupled to the first blade 18A. The second blade assembly 180B may comprise the second blade 18B and a second blade support member or blade carrier 120B coupled to the second blade 18B. The third blade assembly 180C may comprise the third blade 18C and a third blade support member or blade carrier 120C coupled to the third blade 18C. The fourth blade assembly 180D may comprise the fourth blade 18D and a fourth blade support member or blade carrier 120D coupled to the fourth blade 18D. The fifth blade assembly 180E may comprise the fifth blade 18E and a fifth blade support member or blade carrier 120E coupled to the fifth blade 18E. The blade support members 120A-120E may comprise, for example, stainless steel. The blade support members 120A-120E may be integral with their corresponding blades 18A-18E, or alternatively, the blades 18A-18E may be fixedly coupled to the respective blade support members 120A-120E, such as by welding, adhesive, or other suitable technique. Each blade assembly 180A-180E may be mounted within the cartridge housing 16 of the razor cartridge 14. The blade support members 120A-120E may be positioned within a respective blade slot 162A-162E extending in the cartridge housing 16, in an X direction, of the housing 16, see FIG. 1, and may be fixed or floating. For example, the blade support members 120A-120E may be resiliently mounted within the housing and may be biased to their raised, at-rest positions (that is, not loaded by shaving forces) via polymeric leaf-spring arms (not shown), one example of which is disclosed in U.S. Pat. No. 10,391,652, the entire disclosure of which is incorporated herein by reference. The blade assemblies 180A-180E may be secured by clips 24B (only one of which is illustrated in FIG. 2A) or other known assembly methods.

Figure 2B:
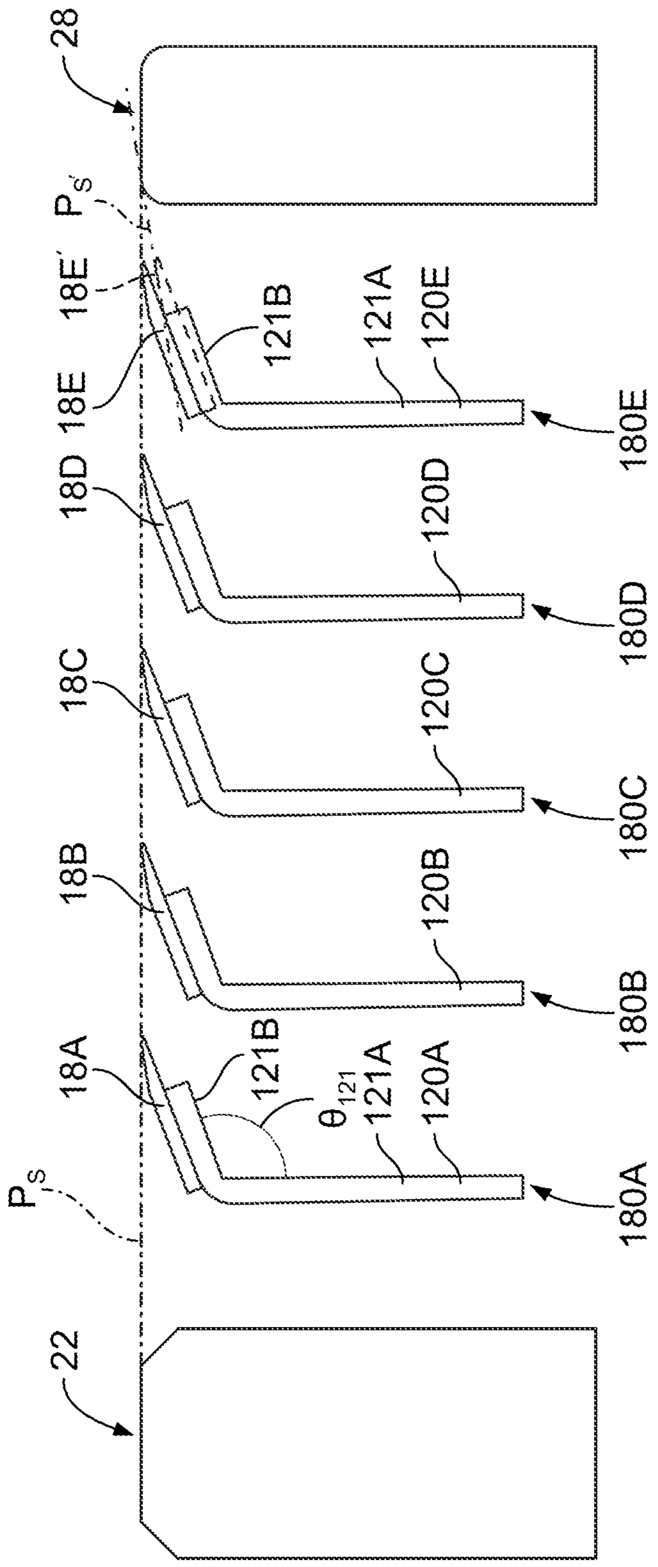
FIG. 2B schematically illustrates cap and guard structures and first, second, third, fourth and fifth razor blade assemblies of a razor cartridge of the present disclosure.

FIG. 2B schematically illustrates the cap structure 22, the guard structure 28 and the first, second, third, fourth and fifth razor blade assemblies 180A-180E of the razor cartridge 14 of FIG. 2A. With reference to FIG. 2B, a plane extending between the upper surfaces of the cap structure 22 and the guard structure 28 of the cartridge housing 16 of the razor cartridge 14 may define a shaving plane $P_S$, i.e., a plane tangent to each of the cap structure and guard structure 22 and 28. For razor cartridge embodiments where not all of the cap structure, guard structure and uppermost portions of the razor blades are located within a same plane, the "shaving plane" for a given razor blade within such a razor cartridge may be defined as a plane extending between skin contacting elements immediately in front of and behind a razor blade tip of the given razor blade. For example, in a modified embodiment as shown in phantom in FIG. 2B, the uppermost portion of blade 18E' is located slightly below the locations of the blade 18E shown in solid line as well as the upper surface of the guard structure 28. The shaving plane $P_{S'}$ for the modified blade 18E' extends from the upper surface of the guard structure 28' to the uppermost portion of a skin contacting element behind the tip of the blade 18E, which comprises the bevel shoulder of the blade 18E'.

It is well known that the shaving geometry of a razor cartridge is important in determining the shaving performance of the cartridge. The shaving geometry defines the position and orientation of the blades in relation to other skin contacting parts, in particular, the cap structure and guard structure of the razor cartridge. One parameter of the shaving geometry is blade exposure, which is the perpendicular distance by which the cutting edge of a blade protrudes above or below the shaving plane. In the embodiment illustrated in FIG. 2B, the first, second, third, fourth and fifth blade support members 120A-120E may be configured to position their respective blades 18A-18E such that the bevel shoulder 41 of the substrate 30 defining each blade 18A-18E is positioned in or near the shaving plane $P_S$, see also FIGS. 3A-3C. More particularly, each of the blade support members 120A-120E may comprise a lower portion 121A and an upper portion 121B, which extends at an angle of $\Theta_{121}$ of from 100 degrees to 125 degrees to the lower portion 121A, see FIG. 2B. The upper portion 121B of each blade support member 120A-120E may be coupled to the outer surface 32B of the first portion 32 of the substrate 30 defining the corresponding blade 18A-18E. Due to the asymmetric shape of the substrate 30 and the angle $\Theta_{121}$ between the lower and upper portions 121A and 121B of each blade support member, the bevel shoulder 41 of the substrate 30 defining each blade 18A-18E is positioned in or near the shaving plane $P_S$, see also FIGS. 3A-3C.

Figure 3C:
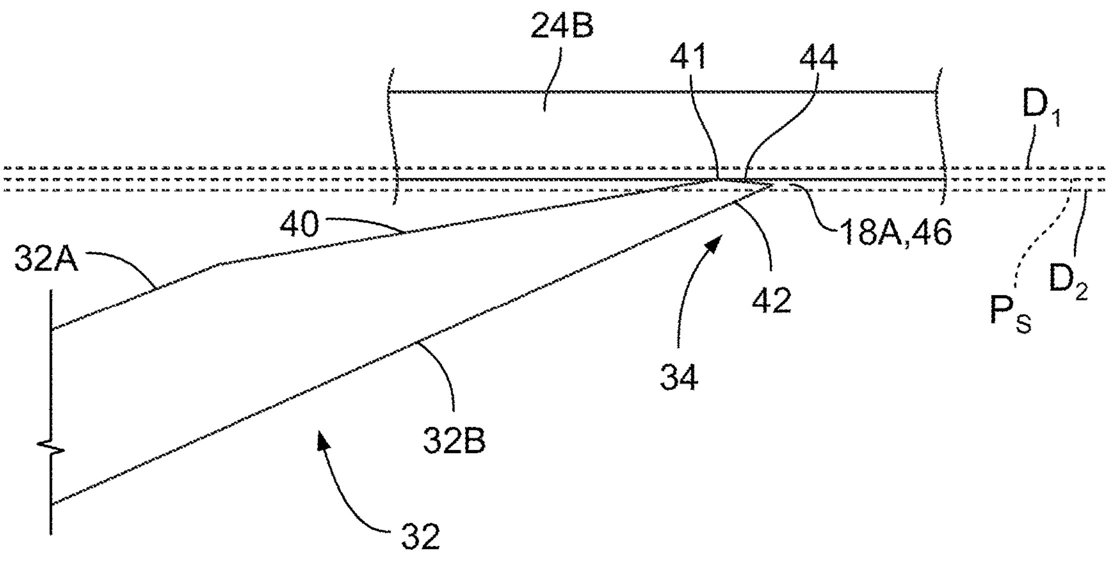
FIG. 3C illustrates a bevel shoulder on the razor blade of FIGS. 3A and 3B located in a shaving plane.
Figure 3D:
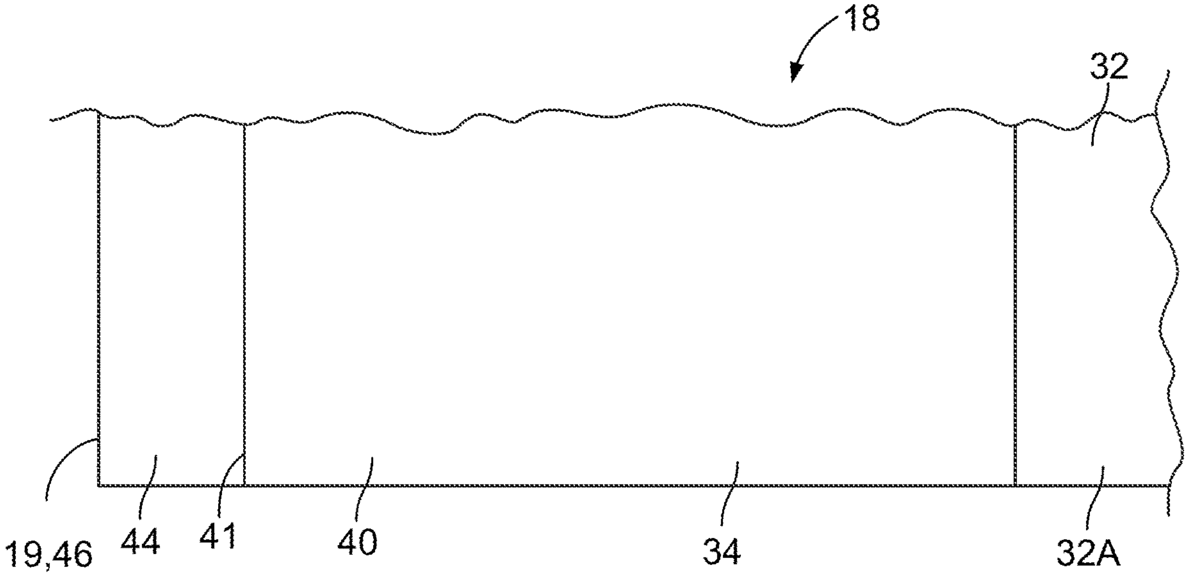
FIG. 3D is a view taken along view line 3D-3D in FIG. 3A.

With reference to FIGS. 3B and 3C, the bevel shoulder 41 is considered to be positioned in or near the shaving plane $P_S$ when a portion of the bevel shoulder 41, which shoulder 41 extends in the X direction, see FIGS. 1 and 3A, lies within the shaving plane $P_S$, i.e., the shaving plane $P_S$ is tangent to the portion of the bevel shoulder 41, or a portion of the bevel shoulder 41 is located slightly above the shaving plane $P_S$ by a distance $D_1$ less than about 0.2 mm from the shaving plane $P_S$ or slightly below the shaving plane $P_S$ by a distance $D_2$ of less than about 0.5 mm from the shaving plane $P_S$, see FIG. 3C. When the bevel shoulder 41 is positioned in or near the shaving plane $P_S$, the cutting edge 19 of the blade 18 may be spaced below the shaving plane $P_S$ by a perpendicular distance $D_{46}$ due to the asymmetrical shape of the blade 18 and the angle $\Theta_{121}$ between the lower and upper portions 121A and 121B of the corresponding blade support member. The perpendicular distance $D_{46}$ may fall within a range of from 0 microns to 46.4 microns and preferably comprises 20 microns, see FIG. 3B. Because the cutting edge 19 of the blade 18 is preferably located below the shaving plane $P_S$, the cutting edge 19 is spaced away from the skin during shaving so as to improve shaving comfort and reduce skin irritation. Also, because the angle $\Theta'$ of the bevel shoulder 41 is large, the bevel shoulder 41 defines a generally smooth surface for engaging the skin of the user, thereby reducing friction as the blade moves across the skin during shaving, see also FIG. 2B.

As noted above, the blades 18A-18E may be mounted within the cartridge housing 16 and secured with clips 24A and 24B. Because the bevel shoulder 41 of the substrate 30 defining each blade 18A-18E is positioned in or near the shaving plane $P_S$, see also FIGS. 3A-3C, the clips 24A and 24B engage the bevel shoulder 41 of each blade 18A-18E, see FIG. 2A. Prior art razor blades were registered with features during a welding operation to secure the blades to corresponding blade support members. The registration features would oftentimes damage or crush the ends of the blade tips. In prior art razor cartridges where blade tips were positioned in or near the shaving plane, the clips would engage ends of the blade tips. However, because the ends of the blade tips were crushed during a prior welding operation, engagement of the crushed blade tip ends by the clips resulted in inconsistent location of the blade cutting edges relative to the shaving plane. In the present invention, because the clips 24A and 24B engage the bevel shoulder 41 of each blade 18A-18E, which shoulder 41 typically is not damaged during a prior welding operation, the location of a blade cutting edge 19 along its entire extent is more consistently and predictably located relative to the shaving plane.

Another important factor in the shaving geometry is the blade tangent angle Ω, see FIG. 3A, which is the angle at which the split line $SL_{34}$ for the asymmetric blade 18 intersects the shaving plane $S_P$. In the embodiment of FIGS. 3A and 3B, the blade tangent angle Ω may fall within a range from 10 degrees to 36 degrees and preferably is 17 degrees.

Figure 4A:
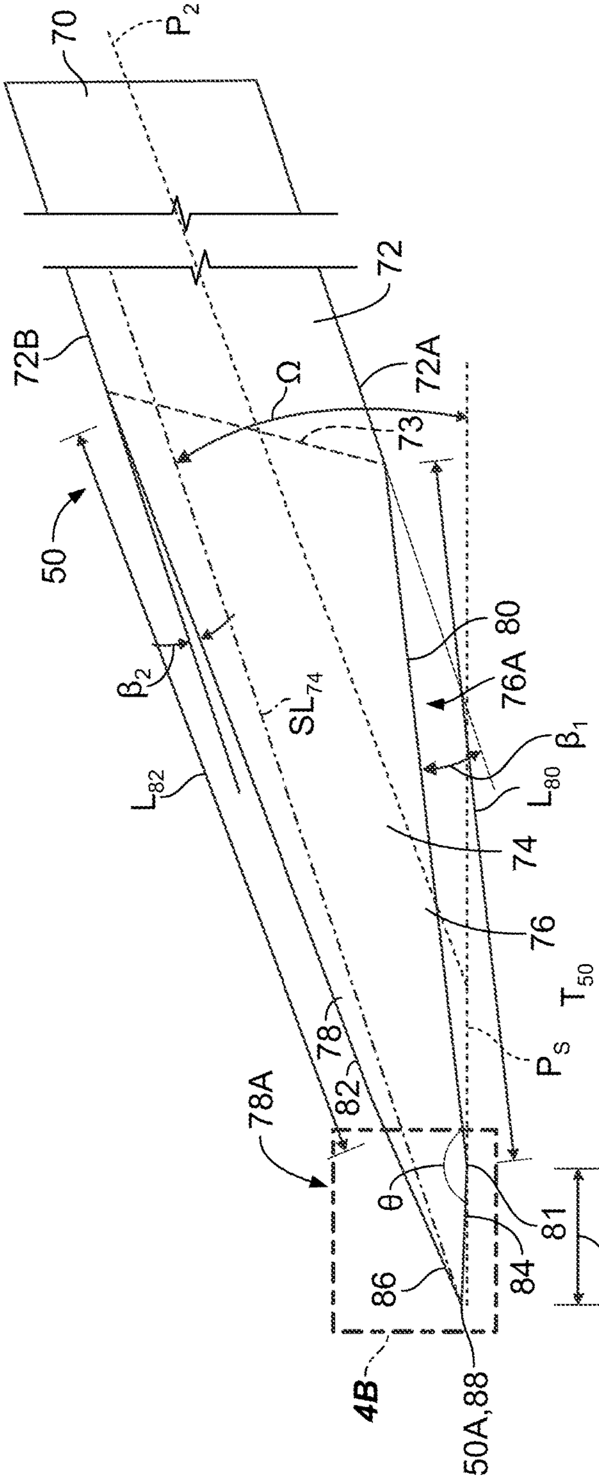
FIG. 4A is a cross-sectional side view of an asymmetrical razor blade in accordance with a second embodiment of the present disclosure.

FIG. 4A is a cross-sectional side view of an asymmetric razor blade 50 in accordance with a second embodiment of the present disclosure. The razor blade 50 is defined by a substrate 70 comprising a first portion 72 comprising a blade body and a second portion 74 comprising a tip portion. In the embodiment of FIG. 4A, dotted line 73 extends between the first and second portions 72 and 74. The razor blade 50 may be formed from stainless steel, other metals and/or alloys, plastic, or any other material or combinations thereof. The first portion 72 may comprise first and second generally parallel outer surfaces 72A and 72B, respectively. The second portion 74 may comprise generally asymmetric first and second sections 76 and 78, respectively, separated by a split line $SL_{74}$, wherein the first and second sections 76 and 78 comprise third and fourth asymmetric outer surfaces 76A and 78A. The split line $SL_{74}$ may pass through a tip 88 of the tip portion 74 and may be generally parallel with the first and second outer surfaces 72A and 72B of the first portion 72 of the blade substrate 70, see FIG. 3A. The split line $SL_{74}$ may extend through the first portion 72. In the example embodiment of FIGS. 4A and 4B, the split line $SL_{74}$ does not separate the first and second portions 72 and 74 into equal halves.

The first section 76 comprises first and third facets 80 and 84 and the second section 78 comprises second and fourth facets 82 and 86. The first facet 80 may extend directly from the first outer surface 72A and may be positioned between the first outer surface 72A and the third facet 84. The third facet 84 may extend directly from the first facet 80. A bevel shoulder 81 may be defined where the first and third facets 80 and 84 meet. The bevel shoulder 81 may be smooth, rounded, or angled. The bevel shoulder 81 is a structure that is generally linear (e.g., extending into the page or along the X direction) running parallel to the cutting edge 50A as shown for instance in FIG. 3D. The second facet 82 may extend directly from the second outer surface 72B and may be positioned between the second outer surface 72B and the fourth facet 86. The fourth facet 86 may extend directly from the second facet 82. The third and fourth facets 84 and 86 may define end facets that converge at the tip 88 to define a cutting edge 50A of the blade 50, which performs the cutting of hair. As will be discussed further below, during use of the razor blade 50, the first bevel shoulder 81 between the first and third facets 80 and 84 may contact and move along the skin of a user. An angle Θ of the bevel shoulder 81, see FIG. 4A, extending from the first facet 80 to the third facet 84 may be from 162 degrees to 176 degrees.

A length $L_{80}$, $L_{82}$ of the first and second facets 80 and 82 may be greater than a length $L_{84}$, $L_{86}$ of each of the third and fourth facets 84 and 86, see FIG. 4A. As shown in FIG. 4A, the length of the second facet 82 may be greater than the length of the first facet 80. The length $L_{84}$ of the third facet 84 may be greater than or less than the length $L_{86}$ of the fourth facet 86. In the illustrated embodiment, the length $L_{80}$ of the first facet 80 may be from 100 microns to 500 microns, the length $L_{82}$ of the second facet 82 may be from 100 microns to 1000 microns, the length $L_{84}$ of the third facet 84 may be from 8 microns to 150 microns, preferably from 8 microns to 50 microns and the length $L_{86}$ of the fourth facet 86 may be from 8 microns to 200 microns. The first facet 80 may extend inwardly at a first angle $\beta_1$ from the first parallel outer surface 72A, the second facet 82 may extend inwardly at a second angle $\beta_2$ from the second parallel outer surface 72B, the third facet 84 may extend inwardly at a third angle $\alpha_1$ from the first facet 80 and the fourth facet 86 may extend inwardly at a fourth angle $\alpha_2$ from the second facet 82, see FIG. 4A. A plane $P_2$ extending through a center of the first portion 72 parallel to the first and second outer surfaces 72A and 72B extends through the first facet 80, see FIG. 4A.

The first angle $\beta_1$ between the first facet 80 and a first line extending from the first outer surface 72A of the first portion 72 may be greater than the second angle $\beta_2$ between the second facet 82 and a second line extending from the second outer surface 72B of the first portion 72. The third angle $\alpha_1$ between the third facet 84 and a third line extending from the first facet 80 may be greater than the fourth angle $\alpha_2$ between the fourth facet 86 and a fourth line extending from the second facet 82. A wedge angle φ may extend between the third and fourth facets 84 and 86. A value of the wedge angle φ may equal to the sum of a value of the first angle $\beta_1$, a value of the second angle $\beta_2$; a value of the third angle $\alpha_1$ and a value of the fourth angle $\alpha_2$. The first angle $\beta_1$ may fall within a range of from 8 degrees to 18 degrees; the second angle $\beta_2$ may fall within a range from 0.5 degrees to 6.0 degrees; the third angle $\alpha_1$ may fall within a range from 4 degrees to 18 degrees and preferably from 8 degrees to 18 degrees; and the fourth angle $\alpha_2$ may fall within a range from 1 degree to 12 degrees and preferably from 2 degrees to 8 degrees. A summation of the first and second angles $\beta_1$ and $\beta_2$ may fall within a range of from 8.5 degrees to 24 degrees. A summation of the first and third angles $\beta_1$ and $\alpha_1$ may fall within a range of from 12 degrees to 28.5 degrees. A summation of the second and fourth angles $\beta_2$ and $\alpha_2$ may fall within a range of from 1.5 degrees to 18 degrees. A difference between the first and second angles $\beta_1$ and $\beta_2$ results in the asymmetric first and second sections 36 and 38 and may fall within a range of from 4 degrees to 17.5 degrees. Preferably, the second angle $\beta_2$ is small so that the overall thickness $T_{50}$ of the blade 50 can be minimized A summation of the first, second, third and fourth angles $\beta_1$, $\beta_2$, $\alpha_1$ and $\alpha_2$, which defines the wedge angle φ, may fall within a range of from 13.5 degrees to 30 degrees. A smaller wedge angle φ is advantageous as it may result in a sharper cutting edge 50A of the blade 50.

As noted above, the split line $SL_{74}$ separating the generally asymmetric first and second sections 76 and 78 of the second portion 74 of the razor blade 50 passes through the tip 88 and is generally parallel with the first and second outer surfaces 72A and 72B of the first portion 72, see FIG. 4A. A substantial portion of the second and fourth facets 82 and 86 may be located closer to the split line $SL_{74}$ than a substantial portion of each of the first and third facets 80 and 84, see FIGS. 4A and 4B.

Figure 4B:
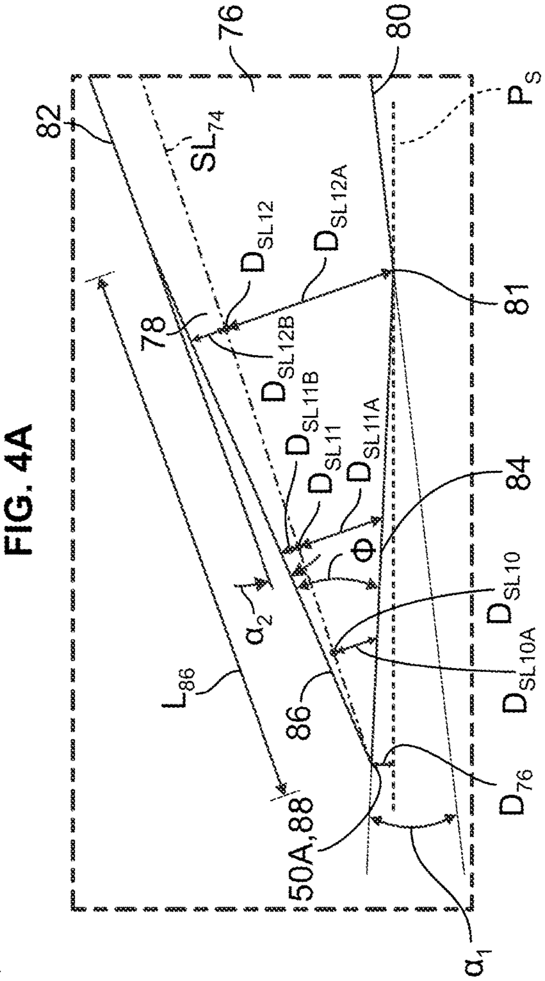
FIG. 4B illustrates an enlarged view of a tip portion of the razor blade of FIG. 4A.

Referring to FIG. 4B, at a first distance $D_{SL10}$ of 4 micrometers along the split line $SL_{74}$ from the tip 88, a sum of a first distance $D_{SL10A}$ perpendicular to the split line $SL_{74}$ and extending from the split line $SL_{74}$ to the third facet 84 and a second distance (reference not provided in FIG. 4B) perpendicular to the split line $SL_{74}$ and extending from the split line $SL_{74}$ to the fourth facet 86 may be between 1.0 microns to 2.3 microns. At a second distance $D_{SL11}$ of 8 micrometers along the split line $SL_{74}$ from the tip 88, a sum of a first distance $D_{SL11A}$ perpendicular to the split line $SL_{74}$ and extending from the split line $SL_{74}$ to the first or the third facet 80, 84 and a second distance $D_{SL11B}$ perpendicular to the split line $SL_{74}$ and extending from the split line $SL_{74}$ to the second or the fourth facet 82, 86 is between 1.9 microns to 4.6 microns. At a third distance $D_{SL12}$ of 16 micrometers along the split line $SL_{74}$ from said tip 46, a sum of a first distance $D_{SL12A}$ perpendicular to the split line $SL_{34}$ and extending from the split line $SL_{74}$ to the first or the third facet 80, 84 and a second distance $D_{SL12B}$ perpendicular to the split line $SL_{74}$ and extending from the split line $SL_{74}$ to the second or the fourth facet 82, 86 is between 3.8 to 9.2 microns.

The razor blade 50 of FIGS. 4A and 4B may be used in place of one or more of the razor blades 18, 18A-18E used in the razor cartridge 14 of FIGS. 1 and 2A. Just as the razor blades 18A-18E are coupled to first, second, third, fourth and fifth blade support members 120A-120E, each razor blade 50 used in the razor cartridge 14 would also be coupled to a corresponding blade support member. The blade support member would then be positioned within a respective blade slot extending in the cartridge housing and may be fixed or floating. Each blade assembly including the blade 50 may be secured by clips or other known assembly methods.

As discussed above with regards to FIG. 2B, each of the blade support members may comprise a lower portion 121A and an upper portion 121B, which extends at an angle of $\Theta_{121}$ from 100 degrees to 125 degrees to the lower portion 121A. The upper portion 121B of each blade support member may be coupled to the second facet 82 of the second portion 74 of the substrate 70 defining the corresponding blade 50. Due to the asymmetric shape of the substrate 70 and the angle $\Theta_{121}$ between the lower and upper portions 121A and 121B of each blade support member, the bevel shoulder 81 of the substrate 30 defining each blade 50 is positioned in or near the shaving plane $P_S$, see also FIGS. 4A-4B.

As noted above, the second facet 82 may extend inwardly at a second angle $\beta_2$ from the second parallel outer surface 72B. Because the upper portion 121B of each blade support member is coupled to the second facet 82 of its corresponding blade 50, rather than the outer surface of the first portion as with the blade 18 of FIGS. 3A-3C, the cutting edge 50A of the blade 50 is located further away from the shaving plane $P_S$ than the cutting edge 19 of the blade 18 of the embodiment of FIGS. 3A-3C. Because the cutting edge 50A is located further away from the shaving plane $P_S$, an advantageous benefit of improved comfort during shaving is provided.

With reference to FIG. 4B, the bevel shoulder 81 is considered to be positioned in or near the shaving plane $P_S$ when a portion of the bevel shoulder 81, which shoulder 81 extends in the X direction, see FIGS. 1 and 4B, lies within the shaving plane $P_S$, i.e., the shaving plane $P_S$ is tangent to the portion of the bevel shoulder 81, or a portion of the bevel shoulder 81 is located slightly above the shaving plane $P_S$ by a distance (see distance $D_1$ in FIG. 3C) of less than about 0.2 mm from the shaving plane $P_S$ or slightly below the shaving plane $P_S$ by a distance (see distance $D_2$ in FIG. 3C) of less than about 0.5 mm from the shaving plane $P_S$. When the bevel shoulder 81 is positioned in or near the shaving plane $P_S$, the cutting edge 50A of the blade 50 may be spaced below the shaving plane $P_S$ by a perpendicular distance $D_{76}$ due to the asymmetrical shape of the blade 50 and the angle $\Theta_{121}$ between the lower and upper portions 121A and 121B of the corresponding blade support member. When the upper portion 121B of a blade support member is coupled to the second facet 82 of a blade 50, the distance $D_{76}$ can be varied by varying the second angle $\beta_2$ between the second facet 82 and the second parallel outer surface 72B of the blade 50. The perpendicular distance $D_{76}$ may fall within a range of from 0 microns to 46.4 microns, see FIG. 4B. Because the cutting edge 50A of the blade 50 may be located below the shaving plane $P_S$, the cutting edge 50A is spaced away from the skin during shaving so as to improve shaving comfort and reduce skin irritation. Also, because the angle Θ of the bevel shoulder 81 is large, the bevel shoulder 81 defines a generally smooth surface for engaging the skin of the user, thereby reducing friction as the blade 50 moves across the skin during shaving.

When the razor blade 50 is used in a razor cartridge, the blade tangent angle Ω may fall within a range from 10 degrees to 36 degrees and preferably 17 degrees.

Representative embodiments of the present disclosure described above can be described as follows:

A. A razor blade comprising:
- a substrate comprising:
  - a first portion comprising first and second generally parallel outer surfaces; and
  - a second portion comprising generally asymmetric first and second sections separated by a split line, wherein the first section comprises first and third facets and the second section comprises a second facet, the first facet extends inwardly from the first parallel outer surface, the second facet extends inwardly from the second parallel outer surface, the second and third facets converge at a tip to define a cutting edge, the split line passes through the tip and is generally parallel with the first and second outer surfaces of the first portion, the second facet is located closer to the split line than the first and third facets, the second facet has a length greater than the length of the third facet and the first facet extends directly from the first outer surface of the first portion and the third facet extends directly from the first facet.

B. The razor blade according to Paragraph A, wherein a plane extending through a center of the first portion extends through one of the first or the third facet.

C. The razor blade according to Paragraphs A or B, wherein a bevel shoulder positioned between the first facet and the third facet defines a skin-contacting surface.

D. The razor blade according to any one of Paragraphs A-C, wherein a first angle between the first facet and the first outer surface of the first portion is greater than a second angle between the second facet and the second outer surface of the first portion.

E. The razor blade according to any one of Paragraphs A-D, wherein a third angle between the third facet and the first facet is greater than a second angle between the second facet and the second outer surface of the first portion.

F. The razor blade according to any one of Paragraphs A-E wherein, at a distance of 4 micrometers from the tip, a sum of a first distance from the third facet to the split line and a second distance from the second facet to the split line is between 1.0 microns to 2.3 microns.

G. The razor blade according to any one of Paragraphs A-F wherein, at a distance of 8 micrometers from said tip, a sum of a first distance from the first or the third facet to the split line and a second distance from the second facet or the second parallel outer surface of the first portion to the split line is between 1.9 microns to 4.6 microns.

H. The razor blade according to any one of Paragraphs A-G wherein, at a distance of 16 micrometers from said tip, a sum of a first distance from the first or the third facet to the split line and a second distance from the second facet or the second parallel outer surface of the first portion to the split line is between 3.8 to 9.2 microns.

I. The razor blade according to any one of Paragraphs A-H, wherein a first angle extending between the first facet and the first outer surface of the first portion has a first value, a second angle extending between the second facet and the second outer surface of the first portion has a second value, a third angle extending between the third facet and the first facet has a third value, and a wedge angle extending between the second facet and the third facet has a fourth value substantially equal to the sum of the first value, the second value and the third value.

J. A razor blade comprising:
- a substrate comprising:
  - a first portion comprising first and second generally parallel outer surfaces; and
  - a second portion comprising first and second sections separated by a split line, wherein the first section comprises a first facet extending directly from the first outer surface of the first portion and an end facet extending directly from the first facet, the second section comprises an end facet, the end facet of the second section has a length greater than the end facet of the first section, the end facets of the first and second sections converge at a tip to define a cutting edge, the split line passes through the tip and is generally parallel with and extends between the first and second outer surfaces of the first portion.

K. The razor blade according to Paragraph J, wherein the end facet of the second section comprises a second facet and the end facet of the first section comprises a third facet.

L. The razor blade according to Paragraph J, wherein the second section further comprises a second facet extending from the second outer surface of the first portion, the end facet of the second section comprises a fourth facet and the end facet of the first section comprises a third facet.

M. The razor blade according to any one of Paragraphs J-L, wherein the end facet of the second section is located closer to the split line than the first facet and the end facet of the first section.

N. A razor blade comprising:
  a substrate comprising:
    a first portion comprising first and second generally parallel outer surfaces; and
    a second portion comprising generally asymmetric first and second sections separated by a split line, wherein the first section comprises first and third facets and the second section comprises second and fourth facets, the first and second facets are positioned between the first and second generally parallel outer surfaces and the third and fourth facets, and the third and fourth facets converge at a tip to define a cutting edge, wherein a length of each of the first and second facets is greater than a length of each of the third and fourth facets.

O. The razor blade according to Paragraph N, wherein the fourth facet has a length greater than a length of the third facet.

P. The razor blade according to Paragraph N or O, wherein a first angle between the first facet and the first outer surface of the first portion is greater than a second angle between the second facet and the second outer surface of the first portion.

Q. The razor blade according to any one of Paragraphs N-P, wherein a third angle between the third facet and the first facet is greater than a fourth angle between the fourth facet and the second facet.

R. The razor blade according to any one of Paragraphs N-Q, wherein at a distance of 4 micrometers from the tip, a sum of a first distance from the third facet to the split line and a second distance from the fourth facet to the split line is between 1.0 microns to 2.3 microns.

S. The razor blade according to any one of Paragraphs N-R, wherein, at a distance of 8 micrometers from said tip, a sum of a first distance from the first or the third facet to the split line and a second distance from the second or the fourth facet to the split line is between 1.9 microns to 4.6 microns.

T. The razor blade according to any one of Paragraphs N-S, wherein, at a distance of 16 micrometers from said tip, a sum of a first distance from the first or the third facet to the split line and a second distance from the second or the fourth facet to the split line is between 3.8 to 9.2 microns.

U. The razor blade according to any one of Paragraphs N-T, wherein an angle between the second facet and the second outer surface of the first portion falls within a range of from 0.5 degree and 6 degrees.

V. The razor blade according to any one of Paragraphs N-U, wherein the split line passes through the tip and is generally parallel with the first and second outer surfaces of the first portion, the second and fourth facets are located closer to the split line than the first and third facets.

W. The razor blade according to any one of Paragraphs N-V, wherein the first facet extends directly from the first outer surface of the first portion and the third facet extends directly from the first facet.

X. The razor blade according to any one of Paragraphs N-W, wherein a first angle extending between the first facet and the first outer surface of the first portion has a first value, a second angle extending between the second facet and the second outer surface of the first portion has a second value, a third angle extending between the third facet and the first facet has a third value, a fourth angle extending between the fourth facet and the second facet has a fourth value and a wedge angle extending between the third facet and the fourth facet has a fifth value substantially equal to the sum of the first value, the second value, the third value and the fourth value.

Y. A razor blade comprising:
  a substrate comprising:
    a first portion including substantially parallel first and second outer surfaces; and
    a second portion comprising first, second, third and fourth facets, wherein the first facet extends from the first outer surface of the first portion inwardly at a first angle and the second facet extends from the second outer surface of the first portion inwardly at a second angle, the third and fourth facets extend from the first and second facets, respectively, inwardly to define a cutting edge and a length of the third facet is different than a length of the fourth facet.

Z. The razor blade according to Paragraph Y, wherein a summation of the first and second angles falls within a range of from 8.5 degrees to 24 degrees.

AA. The razor blade according to Paragraph Y or Z, wherein a difference between the first and second angles falls within a range of from 4 degrees to 17.5 degrees.

AB. The razor blade according to any one of Paragraphs Y, Z or AA, wherein the first angle falls within a range of from 8 degrees to 18 degrees.

AC. The razor blade according to any one of Paragraphs Y, Z, AA or AB, wherein the second angle is different from the first angle.

AD. The razor blade according to any one of Paragraphs Y, Z, AA, AB, or AC, wherein the third facet extends from the first facet inwardly at a third angle and the fourth facet extends from the second facet inwardly at a fourth angle, which is different from the third angle.

AE. The razor blade according to Paragraph AD, wherein a summation of the first and third angles falls within a range of from 12 degrees to 28.5 degrees.

AF. The razor blade according to Paragraph AD or AE, wherein a summation of the second and fourth angles falls within a range of from 1.5 degrees to 18 degrees.

AG. The razor blade according to any one of Paragraphs AD, AE or AF, wherein a summation of the first, second, third and fourth angles falls within a range of from 13.5 degrees to 30 degrees.

AH. A razor blade comprising:
  a substrate comprising:
    a first portion comprising first and second generally parallel outer surfaces; and a second portion comprising generally asymmetric first and second sections separated by a split line, wherein the first section comprises first and third facets and the second section comprises second and fourth facets, the first and second facets are positioned between the first and second generally parallel outer surfaces and the third and fourth facets, the split line passes through the tip and is generally parallel with and extends between the first and second outer surfaces of the first portion, the second and fourth facets are located closer to the split line than the first and third facets.

AI. The razor blade according to Paragraph AH, wherein the first facet extends directly from the first outer surface of the first portion, the second facet extends directly from the second outer surface of the first portion, the third facet extends directly from the first facet and the fourth facet extends directly from the second facet.

AJ. The razor blade according to Paragraph AH or AI, wherein the fourth facet has a length greater than a length of the third facet.

AK. The razor blade according to any one of Paragraphs AH, AI or AJ, wherein a first angle between the first facet and the first outer surface of the first portion is greater than a second angle between the second facet and the second outer surface of the first portion.

AL. The razor blade according to any one of Paragraphs AH, AI, AJ or AK, wherein a third angle between the third facet and the first facet is greater than a fourth angle between the fourth facet and the second facet.

The illustrations presented herein are not intended to be actual views of any particular substrate, apparatus (e.g., device, system, etc.), or method, but are merely idealized and/or schematic representations that are employed to describe and illustrate various embodiments of the disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor blade comprising:

a substrate comprising:

a first portion comprising first and second parallel outer surfaces; and a second portion comprising asymmetric first and second sections separated by a split line, wherein the first section comprises first and third facets and the second section comprises a second facet, the first facet extends inwardly from the first parallel outer surface toward the third facet and in the direction of the second outer surface, the second facet extends inwardly from the second parallel outer surface toward the first outer surface, the second and third facets converge at a tip to define a cutting edge, the split line passes through the tip and is parallel with the first and second outer surfaces of the first portion, the second facet has a length greater than the length of the third facet and the first facet extends directly from the first outer surface of the first portion and the third facet extends directly from the first facet, wherein a plane extending through a center of the first portion parallel to the first and second parallel outer surfaces extends through the third facet.

2. The razor blade of claim 1, wherein a bevel shoulder positioned between the first facet and the third facet defines a skin-contacting surface.

3. The razor blade of claim 1, wherein a first angle between the first facet and the first outer surface of the first portion is greater than a second angle between the second facet and the second outer surface of the first portion.

4. The razor blade of claim 1, wherein a third angle between the third facet and the first facet is greater than a second angle between the second facet and the second outer surface of the first portion.

5. The razor blade of claim 1, wherein, at a distance of 4 micrometers from the tip, a sum of a first distance from the third facet to the split line and a second distance from the second facet to the split line is between 1.0 microns to 2.3 microns.

6. The razor blade of claim 1, wherein, at a distance of 8 micrometers from said tip, a sum of a first distance from the first or the third facet to the split line and a second distance from the second facet or the second parallel outer surface of the first portion to the split line is between 1.9 microns to 4.6 microns.

7. The razor blade of claim 1, wherein, at a distance of 16 micrometers from said tip, a sum of a first distance from the first or the third facet to the split line and a second distance from the second facet or the second parallel outer surface of the first portion to the split line is between 3.8 to 9.2 microns.

8. The razor blade of claim 1, wherein a first angle extending between the first facet and the first outer surface of the first portion has a first value, a second angle extending between the second facet and the second outer surface of the first portion has a second value, a third angle extending between the third facet and the first facet has a third value, and a wedge angle extending between the second facet and the third facet has a fourth value equal to the sum of the first value, the second value and the third value.

* * * * *